(12) United States Patent
Okajima et al.

(10) Patent No.: US 11,609,765 B2
(45) Date of Patent: Mar. 21, 2023

(54) CONTROL SYSTEM, MOBILE OBJECT, COMPUTER-READABLE STORAGE MEDIUM, AND CONTROL METHOD

(71) Applicant: HONDA MOTOR CO., LTD., Tokyo (JP)

(72) Inventors: Kazuhiro Okajima, Tokyo (JP); Yuichi Koga, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 27 days.

(21) Appl. No.: 17/468,692

(22) Filed: Sep. 8, 2021

(65) Prior Publication Data

US 2022/0100529 A1 Mar. 31, 2022

(30) Foreign Application Priority Data

Sep. 29, 2020 (JP) .............................. JP2020-164057

(51) Int. Cl.
| | | |
|---|---|---|
| *G06F 9/00* | (2006.01) | |
| *G06F 15/177* | (2006.01) | |
| *G06F 9/4401* | (2018.01) | |
| *G06F 1/20* | (2006.01) | |
| *G06F 1/3206* | (2019.01) | |
| *G06F 8/65* | (2018.01) | |

(52) U.S. Cl.
CPC ............ *G06F 9/4401* (2013.01); *G06F 1/206* (2013.01); *G06F 1/3206* (2013.01); *G06F 8/65* (2013.01)

(58) Field of Classification Search
CPC ...... G06F 1/206; G06F 1/3206; G06F 9/4401; G06F 8/65; H04J 7/0063; H04J 7/123; H04J 2310/48; B60L 1/003; B60L 2240/425; B60L 2240/525; B60L 2240/545; B60L 50/16; B60L 50/60; B60L 58/13; B60L 58/20; B60L 58/26; B60L 2270/40; B60R 16/03
See application file for complete search history.

(56) References Cited

U.S. PATENT DOCUMENTS

2021/0191661 A1 6/2021 Harata

FOREIGN PATENT DOCUMENTS

JP 2020027666 A 2/2020

*Primary Examiner* — Nitin C Patel

(57) ABSTRACT

Provided is a control system, including: a power source control unit for controlling a power source included in a mobile object; a mobile object control unit for controlling the mobile object; and an update control unit for receiving an update program of the power source control unit and the mobile object control unit, and transmitting the update program to one of the power source control unit and the mobile object control unit to be updated by the update program, wherein the power source control unit includes a first storage area to be updated and a second storage area not to be updated by the update program, and the power source control unit includes, in the second storage area, first control information for causing the power source to supply power in a case where the first storage area is updated by the update program transmitted from the update control unit.

20 Claims, 10 Drawing Sheets

CONTROL SYSTEM, MOBILE OBJECT, COMPUTER-READABLE STORAGE MEDIUM, AND CONTROL METHOD

The contents of the following Japanese patent application are incorporated herein by reference:

Japanese Patent Application NO. 2020-164057 filed on Sep. 29, 2020.

BACKGROUND

1. Technical Field

The present invention relates to a control system, a mobile object, a computer-readable storage medium, and a control method.

2. Related Art

Patent Literature 1 discloses an ECU having two completely separated flash surfaces and capable of rewriting an application program at an arbitrary timing such as traveling of a vehicle.

PRIOR ART DOCUMENTS

Patent Document

Patent Literature 1: Japanese Patent Application Publication No. 2020-27666

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

Figure 1:
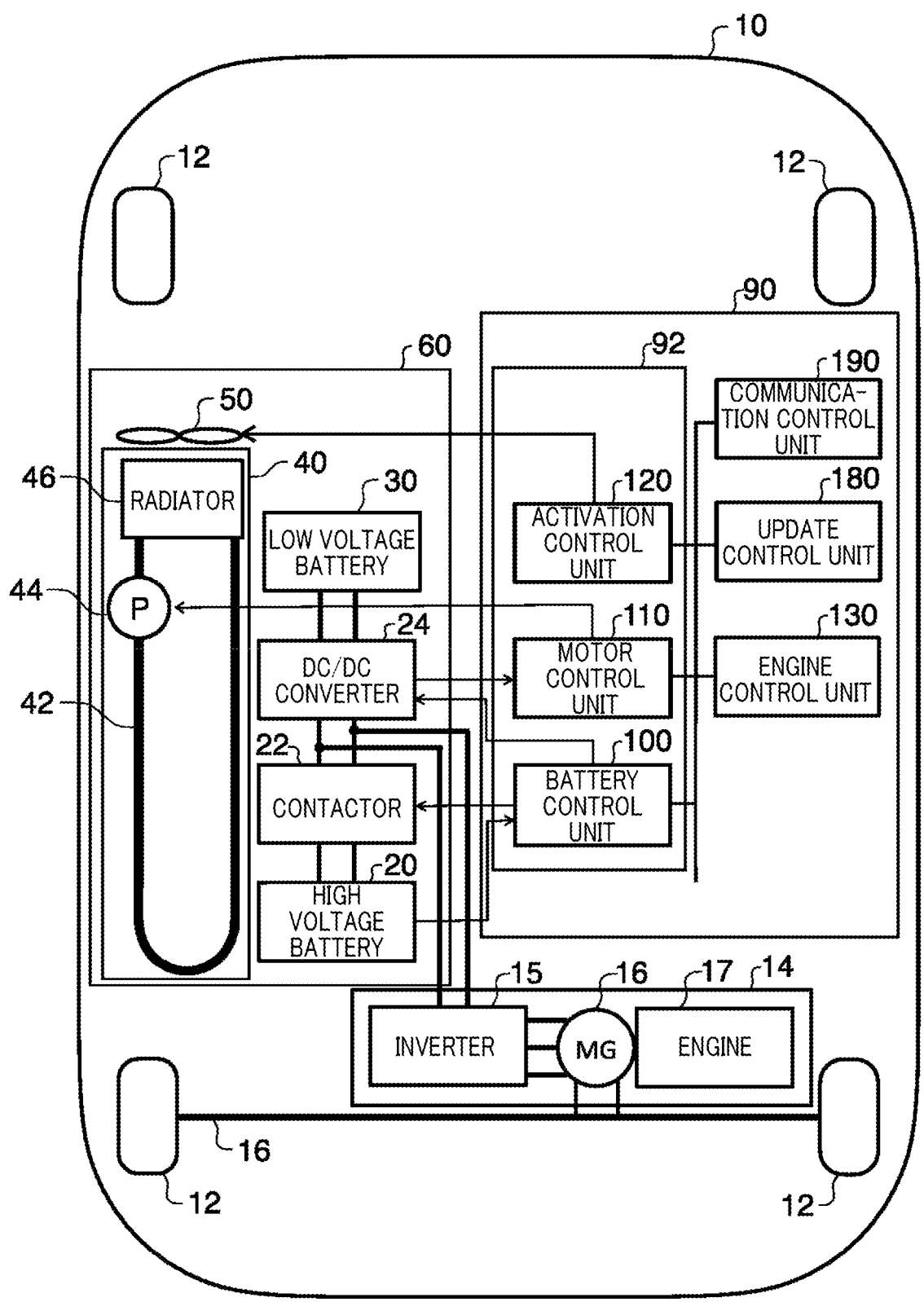
FIG. 1 schematically illustrates a functional configuration of a vehicle 10 according to one embodiment.

FIG. 1 schematically illustrates a functional configuration of a vehicle 10 according to one embodiment. The vehicle 10 is, for example, a hybrid electric vehicle (HEV).

The vehicle 10 includes an axle 11, wheels 12, a drive device 14, a power source 60, and a control system 90. The power source 60 includes a high voltage battery 20, a contactor 22, a DC/DC converter 24, a low voltage battery 30, a cooling device 40, and a fan 50. The cooling device 40 includes a refrigerant circuit 42, a radiator 46, and a pump 44.

The control system 90 includes an update control unit 180, a communication control unit 190, a power source control unit 92, and an engine control unit 130. The power source control unit 92 includes a battery control unit 100, a motor control unit 110, and an activation control unit 120.

The high voltage battery 20 is a chargeable/dischargeable battery. The high voltage battery 20 is, for example, a lithium ion battery, a nickel hydrogen battery, a solid battery, or the like. The high voltage battery 20 is connected to the drive device 14 and an input of the DC/DC converter 24 via the contactor 22.

The drive device 14 generates a driving force for driving the vehicle 10. The drive device 14 generates at least a part of the driving force for driving the vehicle 10 using the electric power supplied from the high voltage battery 20. The drive device 14 includes an inverter 15, a motor generator 16, and an engine 17. The inverter 15 converts DC power into AC power. The motor generator 16 is connected to the output of the inverter 15. The driving force generated by the motor generator 16 is transmitted to the axle 11, and the wheels 12 rotates via the axle 11. The motor generator 16 also converts regenerative energy transmitted to the motor generator 16 through the wheels 12 and the axle 11 into electrical energy. The inverter 15 generates DC power from the electric energy transmitted to the motor generator 16. The high voltage battery 20 is charged by receiving DC power generated by the inverter 15 through the contactor 22. The engine 17 is an internal combustion engine that generates a driving force by energy generated by combustion of fuel. The driving force generated by the engine 17 is transmitted to the axle 11, and the wheels 12 rotate via the axle 11.

In the power source 60, the DC/DC converter 24 steps down and outputs the output of the high voltage battery 20. The high voltage battery 20 is an example of a first battery. The DC/DC converter 24 is an example of a step-down converter that steps down the output voltage of the first battery. The control system 90 can operate on the power output from the DC/DC converter 24.

The low voltage battery 30 is connected to an output of the DC/DC converter 24 and accumulates power output from the DC/DC converter 24. The low voltage battery 30 is an example of a second battery charged by the output of the DC/DC converter 24. The low voltage battery 30 outputs, for example, a voltage of 12 V. The low voltage battery 30 is, for example, a lead acid battery. In a case where the DC/DC converter 24 is not operating, the control system 90 can operate by the power output from the low voltage battery 30. For example, the battery control unit 100 and the engine control unit 130 can be operated by the power supplied from the low voltage battery 30. The low voltage battery 30 serves as a power source of the control system 90 and also mainly serves as a power source of an auxiliary machine provided in the vehicle 10.

The cooling device 40 cools at least one of the high voltage battery 20 and the DC/DC converter 24. In the cooling device 40, the refrigerant circuit 42 allows a coolant as a refrigerant to flow. The coolant flows through the refrigerant circuit 42 by the pump 44. The coolant circulating in the refrigerant circuit 42 circulates between the DC/DC converter 24 and the radiator 46, and between the high voltage battery 20 and the radiator 46. The coolant absorbs heat generated by the DC/DC converter 24 and heat generated by the high voltage battery 20. The heat absorbed by the coolant is dissipated in the radiator 46. The radiator 46 is forcibly radiated heat by the fan 50. The fan 50 is an example of a heat dissipation device that dissipates heat from the cooling device 40.

In the control system 90, the battery control unit 100, the motor control unit 110, and the activation control unit 120 control at least a part of the power source 60. Specifically, the battery control unit 100 controls the operations of the contactors 22 and the DC/DC converter 24. The battery control unit 100 may detect the temperature of the high voltage battery 20 and control the contactors 22 and the DC/DC converter 24 according to the detected temperature. The motor control unit 110 controls the operation of the pump 44. The motor control unit 110 may detect the temperature of the DC/DC converter 24 and control the operation of the pump 44 according to the temperature of the DC/DC converter 24. The motor control unit 110 may acquire the temperature of the high voltage battery 20 from the battery control unit 100 and control the operations of the pump 44 according to the temperature of the high voltage battery 20. The motor control unit 110 is an example of a cooling control unit. The activation control unit 120 controls the operation of the fan 50. The activation control unit 120 is an example of a heat dissipation control unit. Each of the battery control unit 100, the motor control unit 110, and the activation control unit 120 may be respectively realized by an electronic control unit (ECU).

The engine control unit 130 controls the drive device 14. The engine control unit 130 is an example of a drive control unit that controls the drive device 14. Specifically, the engine control unit 130 controls the engine 17. Note that the engine control unit 130 is an example of a vehicle control unit (mobile object control unit) that controls the vehicle 10.

The communication control unit 190 controls communication with the outside. The communication control unit 190 may be a telematics control unit (TCU) that performs radio communication with the outside via a mobile communication network.

The update control unit 180 controls reprogramming of each control unit of the battery control unit 100, the motor control unit 110, the activation control unit 120, and the engine control unit 130. The reprogramming is performed for the purpose of, for example, upgrading the function of each control unit. The update control unit 180 receives update programs of the battery control unit 100, the motor control unit 110, the activation control unit 120, and the engine control unit 130. For example, the update control unit 180 receives the update program transmitted from an external server device by radio communication such as over the air (OTA) via the communication control unit 190. The update control unit 180 may receive the update program in a case where the movement control of the vehicle 10 is not performed. For example, the update control unit 180 may receive the update program in a case where the power source state of the vehicle 10 is turned off.

The update program is a new program that replaces the program stored in each control unit of the battery control unit 100, the motor control unit 110, the activation control unit 120, and the engine control unit 130. The update control unit 180 transmits an update program to a control unit to be updated by the update program among the battery control unit 100, the motor control unit 110, the activation control unit 120, and the engine control unit, and rewrites the program incorporated in the control unit to be updated with the update program.

In a case where the battery control unit 100, the motor control unit 110, the activation control unit 120, or the engine control unit 130 is updated by the update program, at least the battery control unit 100, the motor control unit 110, and the activation control unit 120 are activated.

As an example, in a case where the update program of the engine control unit 130 is received, the update control unit 180 activates the activation control unit 120, activates the battery control unit 100 and the motor control unit 110 via the activation control unit 120, and activates the engine control unit 130 to be updated. While the engine control unit 130 is writing the update program, the battery control unit 100 closes the contactor 22 and operates the DC/DC converter 24 to cause the high voltage battery 20 to supply power. While the engine control unit 130 is writing the update program, the motor control unit 110 operates the pump 44. In addition, the activation control unit 120 operates the fan 50. As a result, it is possible to prevent the state of charge of the low voltage battery 30 from becoming insufficient and cool the DC/DC converter 24 and the high voltage battery 20 while the engine control unit 130 is writing the update program.

The battery control unit 100 includes a non-volatile memory for storing a program for operating the battery control unit 100 and various control parameters. Examples of the non-volatile memory may include a flash memory. The memory includes a boot area that stores a boot program for booting the battery control unit 100, and a main area that stores a main program for performing processing when the vehicle 10 travels. In the boot area, a control program for controlling the contactor 22 and the DC/DC converter 24 is stored.

In a case where the main program of the battery control unit 100 is rewritten with the update program, the battery control unit 100 controls the contactor 22 and the DC/DC converter 24 according to the control program stored in the boot area, and writes the update program in the main area. As a result, while the battery control unit 100 is updated with the update program, the update program can be written in the main area while power is supplied from the high voltage battery 20. Therefore, the battery control unit 100 only needs to have a single main area, and does not need to have a plurality of main areas. Therefore, the battery control unit 100 can be realized by the ECU having a single main area.

Similar to the battery control unit 100, the motor control unit 110 stores a control program for controlling the pump 44 in the boot area of the non-volatile memory included in the motor control unit 110. In addition, similar to the battery control unit 100, the activation control unit 120 stores a control program for controlling the fan 50 in the boot area of the non-volatile memory included in the activation control unit 120. Therefore, while the motor control unit 110 or the activation control unit 120 is updated with the update program, the high voltage battery 20 and the DC/DC converter 24 can be cooled by the control program stored in the boot area, so that the motor control unit 110 and the activation control unit 120 can be realized by the ECU having a single main area.

In order to describe the present embodiment included in the vehicle 10 in an easy-to-understand manner, the battery control unit 100, the motor control unit 110, the activation control unit 120, and the engine control unit 130 will be described as control units to be updated by the update program. The vehicle 10 may include various control units in addition to the control units described in the present embodiment.

Figure 2:
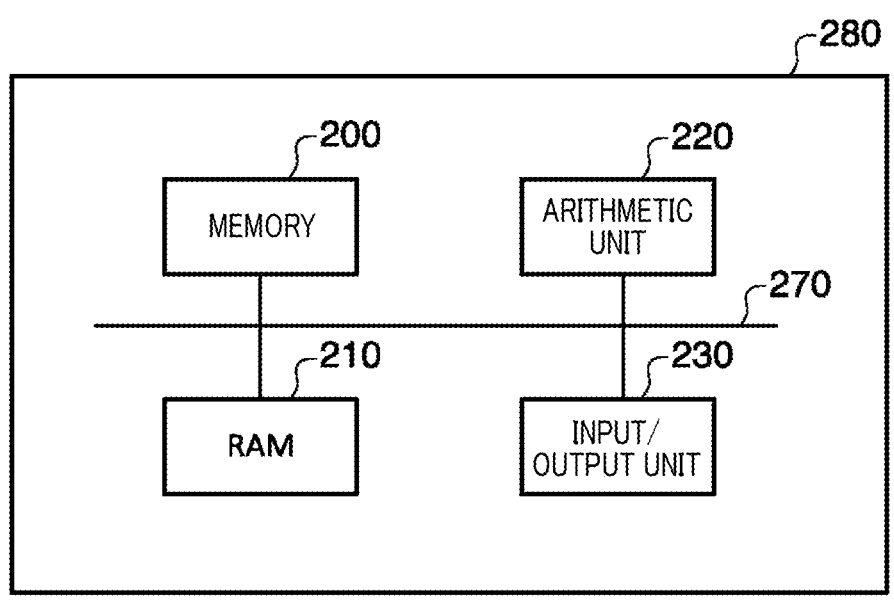
FIG. 2 schematically illustrates a functional configuration of an ECU 280 that implements a battery control unit 100, a motor control unit 110, and an activation control unit 120.

FIG. 2 schematically illustrates a functional configuration of the ECU 280 that implements the battery control unit 100, the motor control unit 110, and the activation control unit 120.

The ECU 280 includes a non-volatile memory 200, a RAM 210, an arithmetic unit 220, an input/output unit 230, and a bus 270. The memory 200, the RAM 210, the arithmetic unit 220, and the input/output unit 230 are interconnected by the bus 270.

The memory 200 is mounted by a flash memory or the like. The memory 200 may be a memory that cannot be rewritten during a normal operation of the ECU 280 (also referred to as a ROM that can be written only under specific conditions). The RAM 210 is realized by an SRAM or the like. The arithmetic unit 220 is realized by an arithmetic processing device such as a processor. The input/output unit 230 is responsible for inputting/outputting information to/from other control units such as the update control unit 180 and other devices (the high voltage battery 20, the contactor 22, the DC/DC converter 24, the pump 44, the fan 50, and the like). The memory 200 stores programs to be executed by the arithmetic unit 220 and control parameters. The arithmetic unit 220 appropriately develops the program and the control parameter stored in the memory 200 in the RAM 210, and performs arithmetic operations according to the program to control other devices and the like.

The ECU that implements the battery control unit 100, the motor control unit 110, and the activation control unit 120 has the same functional configuration as the ECU 280.

Figure 3:
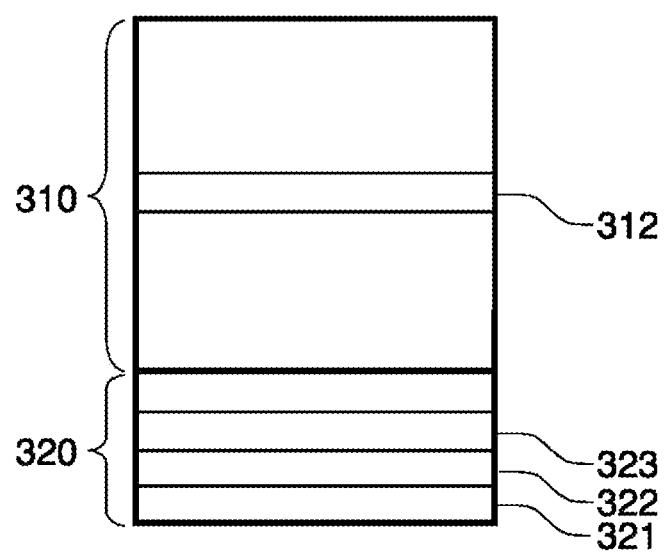
FIG. 3 schematically illustrates a storage area of the battery control unit 100.

FIG. 3 schematically illustrates a storage area of the battery control unit 100. The storage area of the battery control unit 100 refers to the storage area of the non-volatile memory included in the ECU that implements the battery control unit 100, as described in relation to the storage area of the memory 200 in FIG. 2.

The storage area of the battery control unit 100 includes a boot area 320 and a main area 310. The main area 310 is an area to be updated by the update program. The boot area 320 is an area not to be updated by the update program. As described above, the battery control unit 100 includes the main area 310 to be updated by the update program and the boot area 320 not to be updated by the update program. The update program may include arbitrary control information stored in the main area 310.

The boot area 320 is a storage area including a boot program 321 for booting the battery control unit 100. The boot area 320 stores a write program 323 for writing the update program transmitted from the update control unit 180 in the main area 310.

The main area 310 is a storage area for storing control information for controlling the power source 60 in a case where the vehicle 10 is moving. The main area 310 is a storage area that is not rewritten in a case where the battery control unit 100 is operating according to the information stored in the main area 310. The battery control unit 100 does not have a storage area for storing control information for controlling the power source 60 in a case where the vehicle 10 is moving, other than the main area 310.

The main area 310 includes second control information 312 for causing the power source 60 to supply power after the battery control unit 100 is booted. The second control information 312 is control information for controlling the power source 60 in a case where the vehicle 10 is moving. For example, the second control information 312 includes at least control information for controlling the DC/DC converter 24 and the contactor 22.

The battery control unit 100 includes, in the boot area 320, first control information 322 for causing the power source 60 to supply power in a case where the main area 310 is updated by the update program transmitted from the update control unit 180. The first control information 322 includes at least control information for controlling the DC/DC converter 24 and the contactor 22. In a case where the main area 310 included in the battery control unit 100 is updated by the update program, the battery control unit 100 causes the power source 60 to supply power in accordance with the first control information 322. In a case where the engine control unit 130 is updated by the update program, the battery control unit 100 causes the power source 60 to supply power in accordance with the second control information 312.

Figure 4:
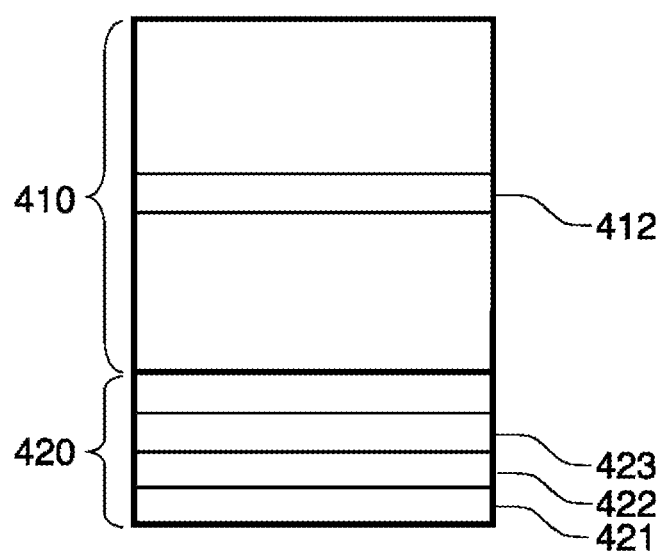
FIG. 4 schematically illustrates a storage area of the motor control unit 110.

FIG. 4 schematically illustrates a storage area of the motor control unit 110. The storage area of the motor control unit 110 refers to the storage area of the non-volatile memory included in the ECU that implements the motor control unit 110, as described in connection with the storage area of the memory 200 of FIG. 2.

The storage area of the motor control unit 110 includes a boot area 420 and a main area 410. The main area 410 is an area to be updated by the update program. The boot area 420 is an area not to be updated by the update program. As described above, the motor control unit 110 includes the main area 410 to be updated by the update program and the boot area 420 not to be updated by the update program. The update program may include arbitrary control information stored in the main area 410.

The boot area 420 is a storage area including a boot program 421 for booting the motor control unit 110. The boot area 420 stores a write program 423 for writing the update program transmitted from the update control unit 180 in the main area 410.

The main area 410 is a storage area for storing control information for controlling the power source 60 in a case where the vehicle 10 is moving. The main area 410 is a storage area that is not rewritten in a case where the motor control unit 110 is operating according to the information stored in the main area 410. The motor control unit 110 does not have a storage area for storing control information for controlling the power source 60 in a case where the vehicle 10 is moving, other than the main area 410.

The main area 410 includes second control information 412 for causing the power source 60 to supply power after the motor control unit 110 is booted. The second control information 412 is control information for controlling the power source 60 in a case where the vehicle 10 is moving. For example, the second control information 412 includes at least control information for controlling the pump 44.

The motor control unit 110 includes, in the boot area 420, first control information 422 for causing the power source 60 to supply power in a case where the main area 410 is updated by the update program transmitted from the update control unit 180. The first control information 422 includes at least control information for controlling the pump 44. In a case where the main area 410 included in the motor control unit 110 is updated by the update program, the motor control unit 110 causes the power source 60 to supply power in accordance with the first control information 422. In a case where the engine control unit 130 is updated by the update program, the motor control unit 110 causes the power source 60 to supply power in accordance with the second control information 412.

Figure 5:
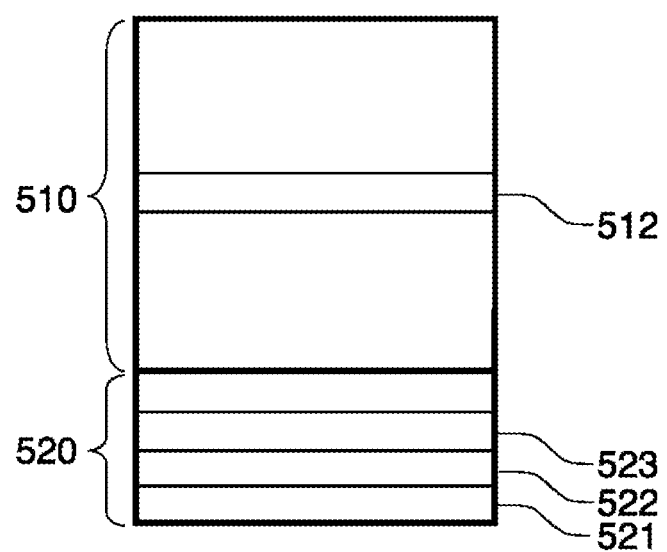
FIG. 5 schematically illustrates a storage area of the activation control unit 120.

FIG. 5 schematically illustrates a storage area of the activation control unit 120. Note that the storage area of the activation control unit 120 refers to a storage area of a non-volatile memory included in the ECU that implements the related battery control unit 100, as described in connection with the storage area of the memory 200 of FIG. 2.

The storage area of the activation control unit 120 includes a boot area 520 and a main area 510. The main area 510 is an area to be updated by the update program. The boot area 520 is an area not to be updated by the update program. As described above, the activation control unit 120 includes the main area 510 to be updated by the update program and the boot area 520 not to be updated by the update program. The update program may include arbitrary control information stored in the main area 510.

The boot area 520 is a storage area including a boot program 521 for booting the activation control unit 120. The boot area 520 stores a write program 523 for writing the update program transmitted from the update control unit 180 in the main area 510.

The main area 510 is a storage area for storing control information for controlling the power source 60 in a case where the vehicle 10 is moving. The main area 510 is a storage area that is not rewritten in a case where the activation control unit 120 operates according to the information stored in the main area 510. The activation control unit 120 does not have a storage area for storing control information for controlling the power source 60 in a case where the vehicle 10 is moving, other than the main area 510.

The main area 510 includes second control information 512 for causing the power source 60 to supply power after the activation control unit 120 is booted. The second control information 512 is control information for controlling the power source 60 in a case where the vehicle 10 is moving. For example, the second control information 512 includes at least control information for controlling the fan 50.

The activation control unit 120 includes, in the boot area 520, first control information 522 for causing the power source 60 to supply power in a case where the main area 510 is updated by the update program transmitted from the update control unit 180. The first control information 522 includes at least control information for controlling the fan 50. In a case where the main area 510 included in the activation control unit 120 is updated by the update program, the activation control unit 120 causes the power source 60 to supply power in accordance with the first control information 522. In a case where the engine control unit 130 is updated by the update program, the activation control unit 120 causes the power source 60 to supply power in accordance with the second control information 512.

Figure 6:
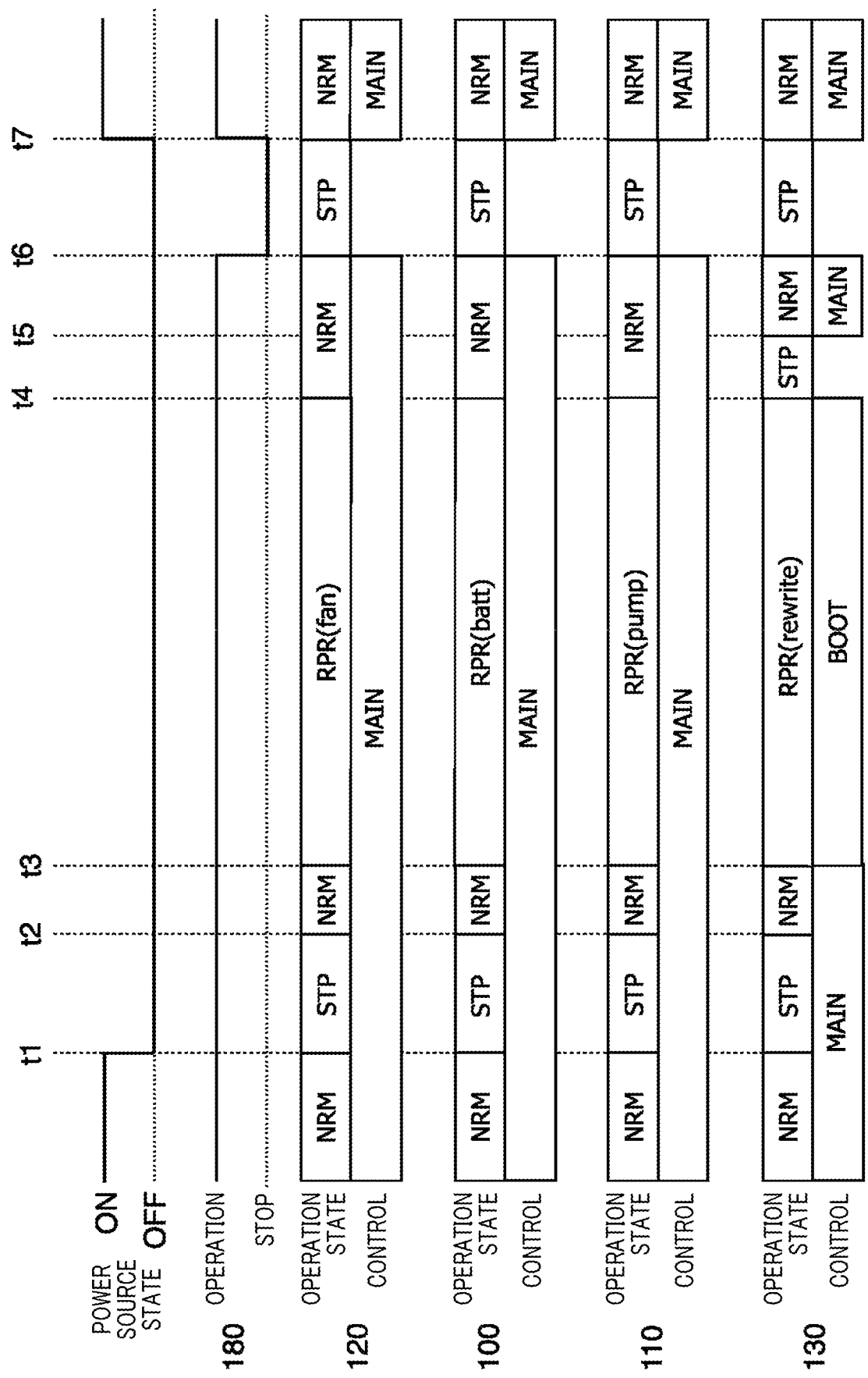
FIG. 6 schematically illustrates a time chart in a case where an engine control unit 130 is updated.

FIG. 6 schematically illustrates a time chart in a case where the engine control unit 130 is updated. FIG. 6 illustrates a power source state of the vehicle 10, an operation state of the update control unit 180, an operation state and control information of the battery control unit 100, an operation state and control information of the motor control unit 110, an operation state and control information of the activation control unit 120, and an operation state and control information of the engine control unit 130.

At time t1, the ignition switch of the vehicle 10 is switched from the ON state to the OFF state, whereby the power source state of the vehicle 10 transitions from the ON state to the OFF state. In response to this, the battery control unit 100, the motor control unit 110, the activation control unit 120, and the engine control unit 130 transition from a normal control state (NRM) to a stopped state (STP). The normal control state (NRM) indicates a normal state in which each control unit is operating according to the control information stored in the main area. Note that, as the control state, "MAIN" indicates that the operation is performed according to the control information stored in the main area, and "BOOT" indicates that the operation is performed according to the control information stored in the boot area.

In a case where the power source state is turned off, the update control unit 180 communicates with the external server to inquire about the presence or absence of the update program of the battery control unit 100, the motor control unit 110, the activation control unit 120, and the engine control unit 130. In this time chart, it is assumed that there is an update program of the engine control unit 130.

The update control unit 180 downloads the update program of the engine control unit 130 from the external server, activates the activation control unit 120 at time t2, and instructs to update the engine control unit 130. Note that the update control unit 180 may inquire of the owner of the vehicle 10 whether to execute the update, and instruct the update of the engine control unit 130 in response to receiving an instruction to execute the update from the owner of the vehicle 10.

In a case where the update of the engine control unit 130 is instructed, the activation control unit 120 activates the battery control unit 100 and the motor control unit 110 necessary for the update operation, and the engine control unit 130 to be updated. In a case where the activation control unit 120, the battery control unit 100, the motor control unit 110, and the engine control unit 130 are in the normal operation state (NRM), the update control unit 180 starts an update session of the engine control unit 130 from time t3.

Specifically, the update control unit 180 transitions the operation state of the activation control unit 120 to an update control state (RPR (fan)) in which the fan 50 for updating a program is operated according to the control information stored in the main area 510. In order to cause the high voltage battery 20 to supply power, the update control unit 180 shifts the operation state of the battery control unit 100 to the update control state (RPR (batt)) in which the contactor 22 is closed according to the control information stored in the main area 310 to operate the DC/DC converter 24. In order to cool the power source 60, the update control unit 180 shifts the operation state of the motor control unit 110 to an update control state (RPR (pump)) in which the pump 44 is operated according to the control information stored in the main area 410. In addition, the update control unit 180 shifts the operation state of the engine control unit 130 to be updated to an update execution state (RPR (rewrite)) in which the update program is written in the main area according to the control information stored in the boot area.

At time t4, in a case where the writing of the update program to the main area of the engine control unit 130 is completed, the update control unit 180 executes hardware reset of the engine control unit 130 and causes the activation control unit 120, the battery control unit 100, and the motor control unit 110 to transition to the normal control state (NRM). In a case where the engine control unit 130 is activated and transitions to the normal operation state at time t5, the update control unit 180 stops the activation control unit 120, the battery control unit 100, the motor control unit 110, and the engine control unit 130 at time t6. Thereafter, in a case where the ignition switch is switched from the OFF state to the ON state at time t7, each of the control units including the activation control unit 120, the battery control unit 100, the motor control unit 110, and the engine control unit 130 is activated.

Figure 7:
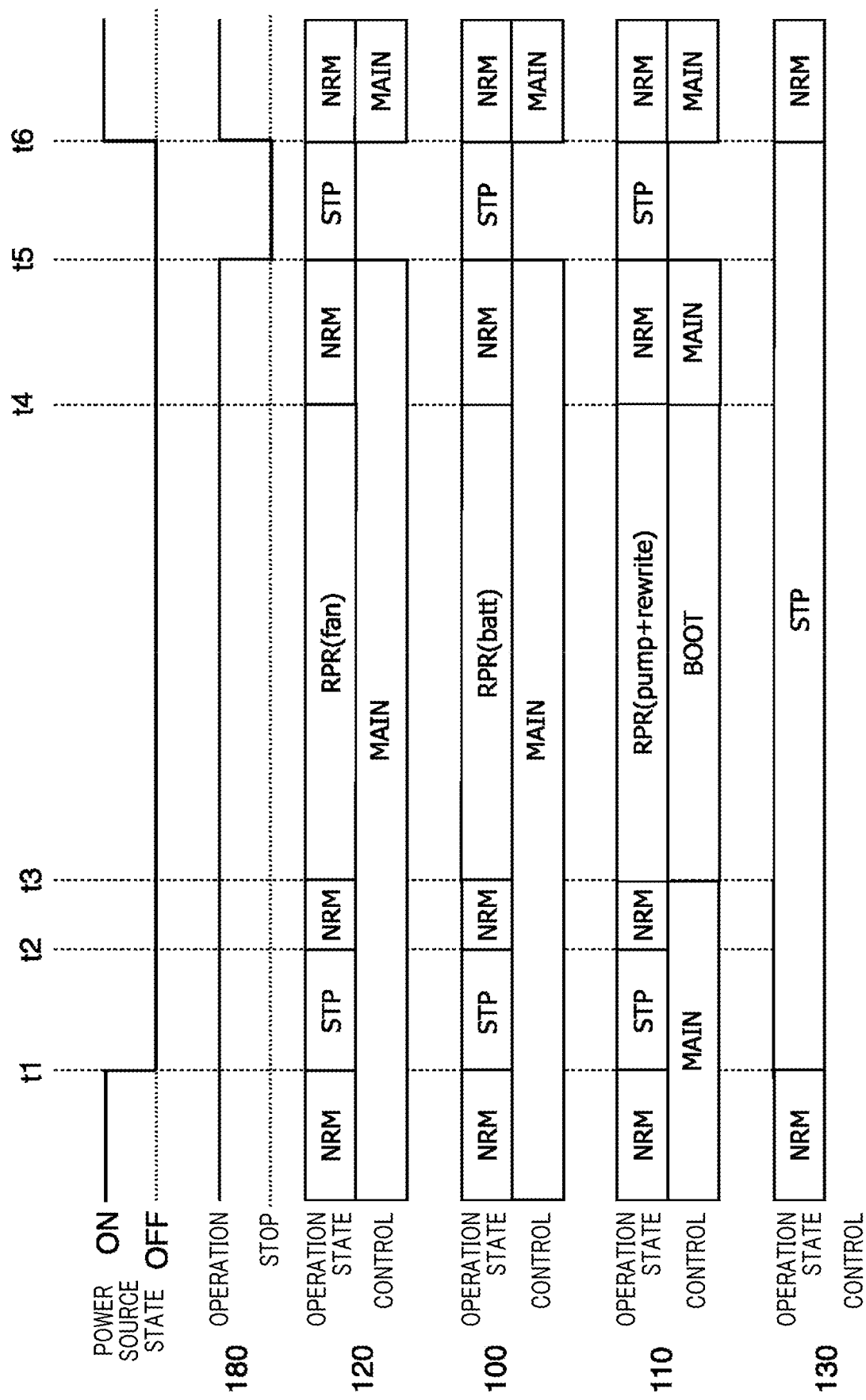
FIG. 7 schematically illustrates a time chart in a case where the motor control unit 110 is updated.

FIG. 7 schematically illustrates a time chart in a case where the motor control unit 110 is updated. Similar to FIG.

6, FIG. 7 illustrates the power source state of the vehicle 10, the operation state of the update control unit 180, the operation state and control information of the battery control unit 100, the operation state and control information of the motor control unit 110, the operation state and control information of the activation control unit 120, and the operation state and control information of the engine control unit 130.

At time t1, the ignition switch of the vehicle 10 is switched from the ON state to the OFF state, whereby the power source state of the vehicle 10 transitions from the ON state to the OFF state. In response to this, the battery control unit 100, the motor control unit 110, the activation control unit 120, and the engine control unit 130 transition from a normal control state (NRM) to a stopped state (STP).

In a case where the power source state is turned off, the update control unit 180 communicates with the external server to inquire about the presence or absence of the update program of the battery control unit 100, the motor control unit 110, the activation control unit 120, and the engine control unit 130. In this time chart, it is assumed that there is an update program of the motor control unit 110.

In a case where the update program of the motor control unit 110 is downloaded from the external server, the update control unit 180 activates the activation control unit 120 at time t2 and instructs to update the motor control unit 110. The update control unit 180 may inquire of the owner of the vehicle 10 whether to execute the update, and instruct the update of the motor control unit 110 in response to receiving an instruction to execute the update from the owner of the vehicle 10.

In a case where the update of the motor control unit 110 is instructed, the activation control unit 120 activates the battery control unit 100 and the motor control unit 110 necessary for the update operation. Since the engine control unit 130 does not need to be activated in a case where the motor control unit 110 is updated, the activation control unit 120 does not activate the engine control unit 130. In a case where the activation control unit 120, the battery control unit 100, and the motor control unit 110 are in the normal operation state (NRM), the update control unit 180 starts an update session of the motor control unit 110 from time t3.

Specifically, the update control unit 180 shifts the operation state of the activation control unit 120 to an update control state (RPR (fan)) in which the fan 50 for updating a program is operated according to the control information stored in the main area 510. In order to cause the high voltage battery 20 to supply power, the update control unit 180 shifts the operation state of the battery control unit 100 to the update control state (RPR (batt)) in which the contactor 22 is closed according to the control information stored in the main area 310 to operate the DC/DC converter 24. In addition, in order to cool the power source 60 and write in the main area 410, the update control unit 180 causes the operation state of the motor control unit 110 to transition to an update execution state (RPR (punp+rewrite)) in which the pump 44 is operated according to the first control information 422 stored in the main area 410 and the main area 410 is written according to the write program 423 stored in the main area 410.

At time t4, in a case where the writing of the update program to the main area 410 of the motor control unit 110 is completed, the update control unit 180 executes hardware reset of the motor control unit 110 and shifts the activation control unit 120 and the battery control unit 100 to the normal control state (NRM). In a case where the motor control unit 110 transitions to the normal operation state, the update control unit 180 stops the activation control unit 120, the battery control unit 100, and the motor control unit 110 at time t5. Thereafter, in a case where the ignition switch is switched from the OFF state to the ON state at time t6, the control units including the activation control unit 120, the battery control unit 100, the motor control unit 110, and the engine control unit 130 are activated.

Figure 8:
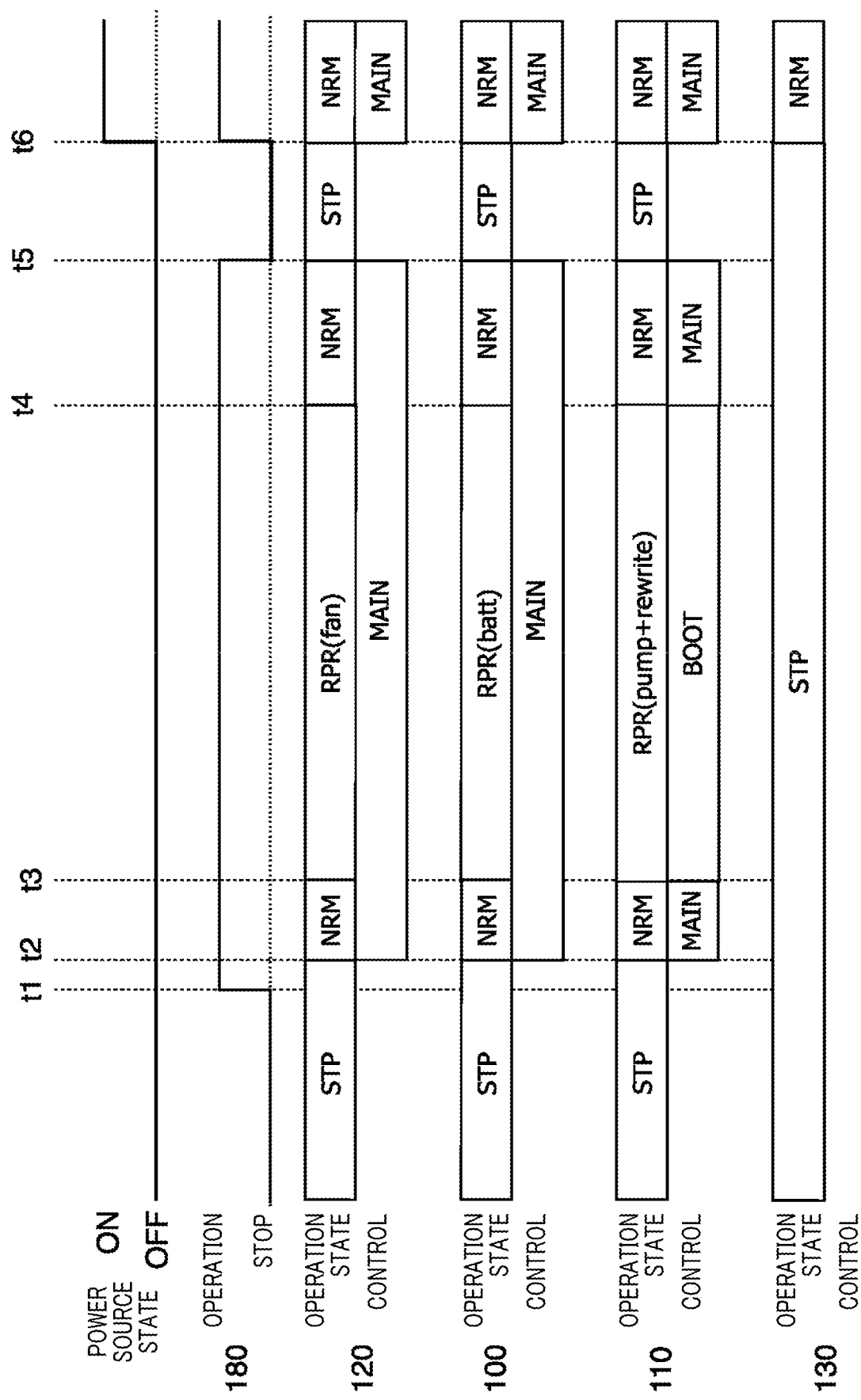
FIG. 8 schematically illustrates another time chart in a case where the motor control unit 110 is updated.

FIG. 8 schematically illustrates another example of the time chart in a case where the motor control unit 110 is updated. Similar to FIG. 7, FIG. 8 illustrates the power source state of the vehicle 10, the operation state of the update control unit 180, the operation state and control information of the battery control unit 100, the operation state and control information of the motor control unit 110, the operation state and control information of the activation control unit 120, and the operation state and control information of the engine control unit 130. FIG. 8 is different from the time chart of FIG. 7 in that it is a time chart when the update program is received in a case where the power source state of the vehicle 10 is in the OFF state.

At time t1, in a case where the update notification of the motor control unit 110 is received from the external server, the update control unit 180 downloads the update program of the motor control unit 110 from the external server. Note that the update control unit 180 may receive an update notification from an external server by push notification. The update control unit 180 may periodically inquire of an external server about the presence of the update program.

Subsequently, at time t2, the activation control unit 120 is activated and the update of the motor control unit 110 is instructed. Further, the update control unit 180 may inquire of the owner of the vehicle 10 whether to execute the update, and instruct the update of the motor control unit 110 in response to receiving an instruction to execute the update from the owner of the vehicle 10. Since the time chart after time t2 is the same as the time chart after time t2 in FIG. 7.

In relation to FIG. 7 and FIG. 8, an example of a time chart in a case where the motor control unit 110 is updated has been described. In a case where the battery control unit 100 and the activation control unit 120 are updated, the same time chart as FIG. 7 and FIG. 8 can be applied except that the control unit to be updated is different, so the details are omitted.

Figure 9:
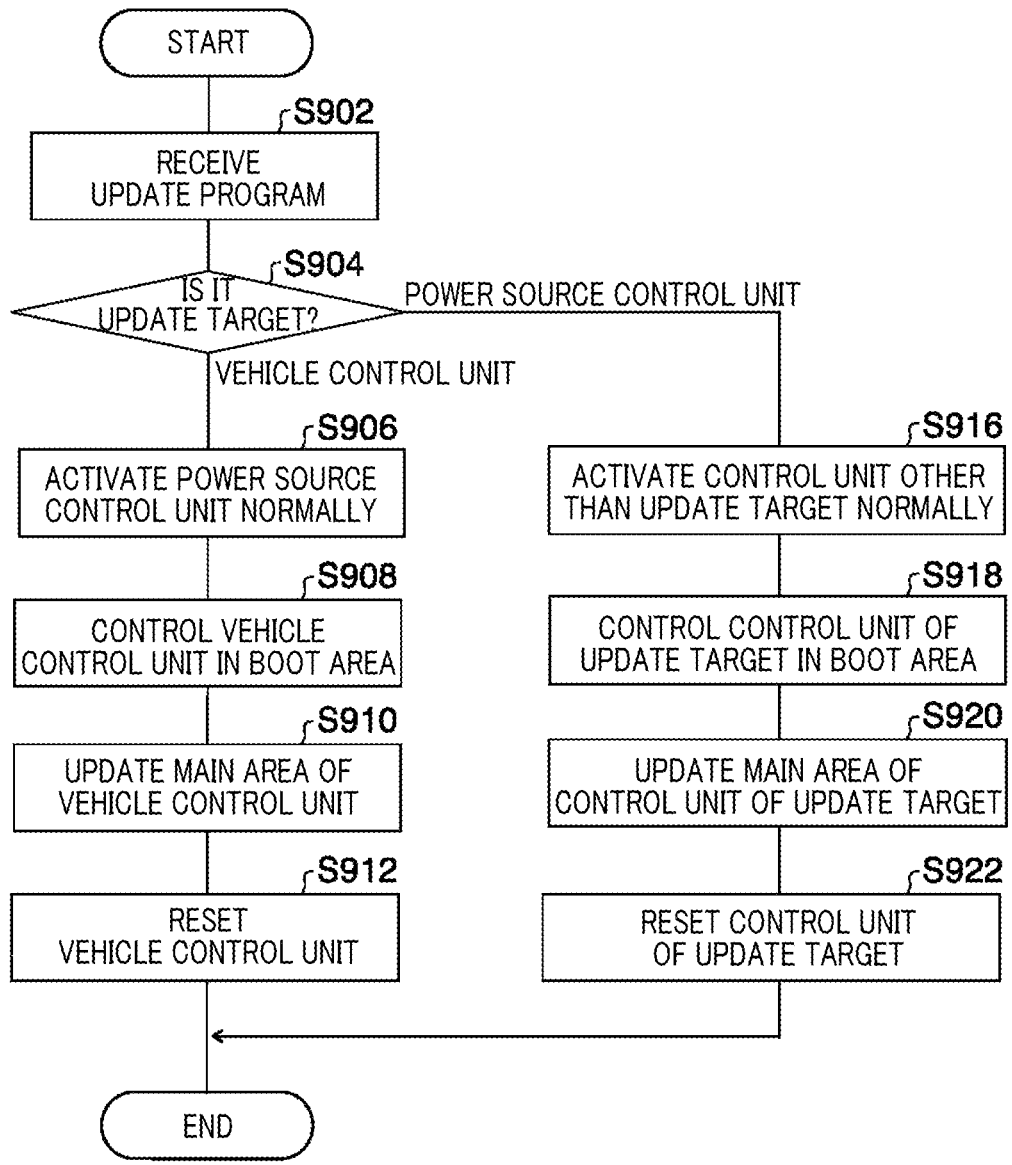
FIG. 9 is a flowchart related to a control method.

FIG. 9 illustrates a flowchart on a control method in a case where the battery control unit 100, the motor control unit 110, the activation control unit 120, and the engine control unit 130 are updated. The process of this flowchart is started, for example, in a case where the ignition switch is turned off or in a case where the external server informs that an update program exists.

In S902, the update control unit 180 receives the update program transmitted by radio communication from the external server. In S904, the update control unit 180 determines whether the update target by the update program is a vehicle control unit that controls the vehicle 10 or a power source control unit that controls the power source 60. In the present embodiment, the engine control unit 130 corresponds to the vehicle control unit, and the battery control unit 100, the motor control unit 110, and the activation control unit 120 correspond to the power source control unit.

In a case where the update target is the vehicle control unit in the determination of S904, the update control unit 180 activates the battery control unit 100, the motor control unit 110, and the activation control unit 120 in S906 to set the normal operation state in which the operation is performed with the control information of the main area. In S908, the update control unit 180 sets the vehicle control unit to be updated to a state in which the update program can be written according to the control information stored in the boot area. In S910, the update control unit 180 transmits the update program to the vehicle control unit to write the update program in the main area of the vehicle control unit. In S912, the vehicle control unit to be updated is reset.

In a case where the update target is the power source control unit in the determination of S904, the update control unit 180 activates the control unit other than the control unit to be the update target among the battery control unit 100, the motor control unit 110, and the activation control unit 120 in S916, and sets the normal operation state in which the operation is performed with the control information of the main area. In S918, the update control unit 180 sets the control unit to be updated among the battery control unit 100, the motor control unit 110, and the activation control unit 120 to a state in which the update program can be written and the power source 60 can be controlled according to the control information stored in the boot area. In S920, the update control unit 180 transmits the update program to the control unit to be updated, and causes the update program to be written in the main area of the control unit to be updated. In S922, the update control unit 180 resets the control unit to be updated.

According to the control system 90 described above, the battery control unit 100, the motor control unit 110, and the activation control unit 120 include control information for controlling the power source 60 in the boot area. Therefore, even in a case where the main areas of the battery control unit 100, the motor control unit 110, and the activation control unit 120 are updated by the update program, the update can be executed while the power source 60 is operated. Therefore, even if the battery control unit 100, the motor control unit 110, and the activation control unit 120 are realized by an ECU that does not have a plurality of main areas, it is possible to execute update while operating the power source 60. As a result, the battery control unit 100, the motor control unit 110, and the activation control unit 120 can be selected from among ECUs having a single main area, and thus the degree of freedom in selecting an ECU is increased. In addition, the cost of the vehicle 10 can be reduced.

In the present embodiment, the battery control unit 100, the motor control unit 110, the activation control unit 120, and the engine control unit 130 are taken up as update targets by the update program, and a case where the control unit having no plurality of main areas is updated has been described. However, for example, a control unit of an entertainment device (for example, a device that processes multimedia information such as video and music or information acquired through a communication line such as the Internet) may be desirably updated more frequently than a control unit that controls a vehicle. Therefore, among the control units included in the vehicle 10, a control unit that is assumed to be frequently updated may be realized by, for example, an ECU including two main areas so as to be able to be updated while the vehicle 10 is traveling. For example, in a case where the control unit performs control according to control information stored in one main area, the other main area may be updated with the update program, and the main program may be loaded from the other main area at the time of next activation.

Note that the vehicle 10 is an example of a mobile object. The mobile object includes transportation equipment such as automobiles (cars and buses), straddled vehicles, aircraft, and ships. The mobile object is not limited to the transportation equipment, and may be any movable equipment.

Figure 10:
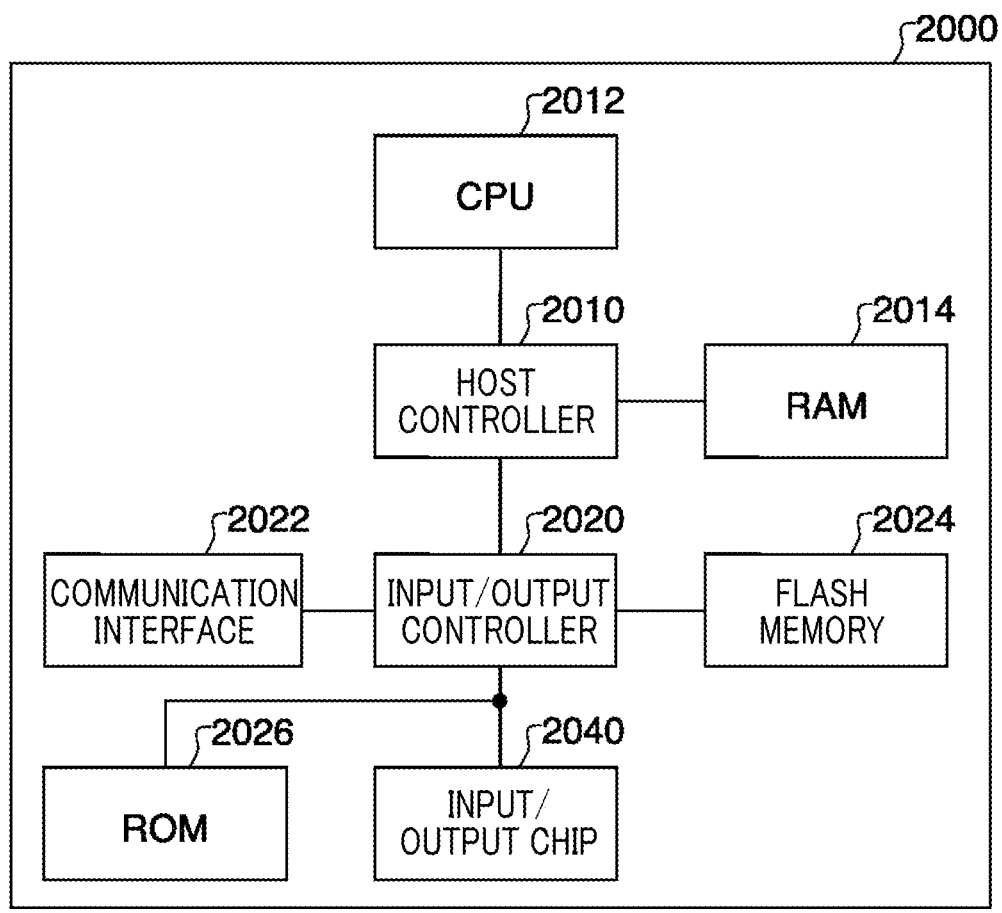
FIG. 10 illustrates an example of a computer 2000.

FIG. 10 illustrates an example of a computer 2000 in which the plurality of embodiments of the present invention may be fully or partially embodied. The program installed in the computer 2000 can cause the computer 2000 to function as a device such as a control unit according to the embodiments or each unit of the device, execute an operation associated with the device or each unit of the device, and/or execute a process according to the embodiments or a stage of the process. Such programs may be executed by a CPU 2012 to cause the computer 2000 to perform certain operations associated with some or all of the blocks in the processing procedures and block diagrams described in the present specification.

The computer 2000 according to the present embodiment includes a CPU 2012 and a RAM 2014, which are connected to each other by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via the input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program executed by the computer 2000 at the time of activation and/or a program depending on hardware of the computer 2000. The input/output chip 2040 may also connect various input/output units, such as keyboards, mouses, and monitors, to the input/output controller 2020 via input/output ports, such as serial ports, parallel ports, keyboard ports, mouse ports, monitor ports, USB ports, HDMI (registered trademark) ports, and the like.

The program is provided via a computer-readable medium or network such as a CD-ROM, a DVD-ROM, or a memory card. The RAM 2014, the ROM 2026, or the flash memory 2024 is an example of a computer-readable medium. The program is installed in the flash memory 2024, the RAM 2014, or the ROM 2026 and executed by the CPU 2012. The information processing described in these programs is read by the computer 2000 and provides cooperation between the programs and the various types of hardware resources. The device or method may be configured by implementing operation or processing of information according to the use of the computer 2000.

For example, in a case where communication is performed between the computer 2000 and an external device, the CPU 2012 may execute a communication program loaded in the RAM 2014 and instruct the communication interface 2022 to perform communication processing on the basis of a process described in the communication program. Under the control of the CPU 2012, the communication interface 2022 reads transmission data stored in a transmission buffer processing area provided in a recording medium such as the RAM 2014 and the flash memory 2024, transmits the read transmission data to the network, and writes reception data received from the network in a reception buffer processing area or the like provided on the recording medium.

In addition, the CPU 2012 may cause all or a necessary portion of a file or a database stored in a recording medium such as the flash memory 2024 to be read by the RAM 2014, and may execute various types of processing on data on the RAM 2014. Next, the CPU 2012 writes back the processed data to the recording medium.

Various types of information such as various types of programs, data, tables, and databases may be stored in a recording medium and subjected to information processing. The CPU 2012 may execute various types of processing on the data read from the RAM 2014, including various types of operations, information processing, conditional determination, conditional branching, unconditional branching, information retrieval/replacement, and the like, which are described in the present specification and specified by a command sequence of a program, and writes back the results to the RAM 2014. Further, the CPU 2012 may retrieve information in a file, a database, or the like in the recording medium. For example, in a case where a plurality of entries each having the attribute value of a first attribute associated with the attribute value of a second attribute is stored in the recording medium, the CPU 2012 may retrieve the plurality of entries for an entry matching the condition in which the attribute value of the first attribute is specified, read the attribute value of the second attribute stored in the entry, and thereby acquire the attribute value of the second attribute associated with the first attribute satisfying the predetermined condition.

The programs or software modules described above may be stored in a computer-readable storage medium on or near the computer 2000. A recording medium such as a hard disk or a RAM provided in a server system connected to a dedicated communication network or the Internet can be used as the computer-readable medium. The program stored in the computer-readable medium may be provided to the computer 2000 via a network.

A program installed in the computer 2000 and causing the computer 2000 to function as the control unit may work on the CPU 2012 or the like to cause the computer 2000 to function as each unit of the control unit. The information processing described in these programs is read by the computer 2000 to function as each unit of a control unit that is a specific means in which software and the above-described various hardware resources cooperate. Then, by realizing arithmetic operations or processing of information according to the use purpose of the computer 2000 in the present embodiment by these specific means, a specific control unit according to the use purpose is constructed.

Various embodiments have been described with reference to block diagrams and the like. In the block diagram, each block may represent (1) a stage of a process in which an operation is executed or (2) each unit of a device having a role of executing the operation. Certain stages and portions may be implemented by dedicated circuitry, programmable circuitry provided with computer-readable instructions stored on a computer-readable medium, and/or a processor provided with computer-readable instructions stored on a computer-readable medium. Dedicated circuitry may include digital and/or analog hardware circuitry and may include integrated circuitry (IC) and/or discrete circuitry. The programmable circuit may include reconfigurable hardware circuitry including memory elements such as logic AND, logic OR, logic XOR, logic NAND, logic NOR, and other logic operations, flip-flops, registers, field programmable gate arrays (FPGA), programmable logic arrays (PLA), and the like.

The computer-readable medium may include any tangible device capable of storing instructions for execution by a suitable device, such that the computer-readable medium having the instructions stored thereon constitutes at least a part of an article of manufacture including instructions that may be executed to provide a means for executing a processing procedure or an operation specified in the block diagram. Examples of the computer-readable medium may include an electronic storage medium, a magnetic storage medium, an optical storage medium, an electromagnetic storage medium, a semiconductor storage medium, and the like. More specific examples of the computer-readable medium may include a floppy disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include either source code or object code written in any combination of one or more programming languages, including assembler instructions, instruction-set-architecture (ISA) instructions, machine instructions, machine-dependent instructions, microcode, firmware instructions, state-setting data, or an object oriented programming language such as Smalltalk®, JAVA®, C++, or the like, and conventional procedural programming languages, such as the "C" programming language or similar programming languages.

The computer-readable instructions may be provided for a processor or programmable circuitry of a general purpose computer, special purpose computer, or other programmable data processing device locally or via a wide area network (WAN), such as a local area network (LAN), the Internet, or the like, and execute the computer-readable instructions to provide means for performing the described processing procedures or operations specified in the block diagrams. Examples of the processor include a computer processor, a processing unit, a microprocessor, a digital signal processor, a controller, a microcontroller, and the like.

Although the present invention has been described using the embodiments, the technical scope of the present invention is not limited to the scope described in the above embodiments. It is apparent to those skilled in the art that various modifications or improvements can be made to the above embodiments. It is apparent from the description of the claims that a mode to which such a change or improvement is added can also be included in the technical scope of the present invention.

It should be noted that the order of execution of each processing such as operations, procedures, steps, and stages in the devices, systems, programs, and methods illustrated in the claims, the specification, and the drawings can be realized in any order unless "before", "prior to", or the like is specifically stated, and unless the output of the previous processing is used in the later processing. Even if the operation flow in the claims, the specification, and the drawings is described using "First", "Next", and the like for convenience, it does not mean that it is essential to perform in this order.

EXPLANATION OF REFERENCES

10: vehicle; 11: axle; 12: wheel; 14: drive device; 15: inverter; 16: motor generator; 17: engine; 20: high voltage battery; 22: contactor; 24: DC/DC converter; 30: low voltage battery; 40: cooling device; 42: refrigerant circuit; 44: pump; 46: radiator; 200: memory; 50: fan; 60: power source; 90: control system; 92: power source control unit; 100: battery control unit; 110: motor control unit; 120: activation control unit; 130: engine control unit; 180: update control unit; 190: communication control unit; 210: RAM; 220: arithmetic unit; 230: input/output unit; 270: bus; 280: ECU; 310: main area; 312: second control information; 320: boot area; 321: boot program; 322: first control information; 323: program; 410: main area; 412: second control information; 420: boot area; 421: boot program; 422: first control information; 423: program; 510: main area; 512: second control information; 520: boot area; 521: boot program; 522: first control information; 523: program; 2000: computer; 2010: host controller; 2012: CPU; 2014: RAM; 2020: input/output controller; 2022: communication interface; 2024: flash memory; 2026: ROM; 2040: input/output chip

What is claimed is:

1. A control system comprising:
   a power source control unit configured to control a power source included in a mobile object;
   a mobile object control unit configured to control the mobile object; and
   an update control unit configured to receive an update program of the power source control unit and the mobile object control unit, and transmit the update program to one of the power source control unit and the mobile object control unit to be updated by the update program, wherein
   the power source control unit includes a first storage area to be updated by the update program and a second storage area not to be updated by the update program, and
   the power source control unit includes, in the second storage area, first control information for causing the power source to supply power in a case where the first storage area is updated by the update program transmitted from the update control unit.

2. The control system according to claim 1, wherein
   the second storage area is a storage area including a boot program for booting the power source control unit.

3. The control system according to claim 1, wherein
   the second storage area is configured to store a write program for writing the update program transmitted from the update control unit to the first storage area.

4. The control system according to claim 1, wherein
   the first storage area is a storage area configured to store control information for controlling the power source in a case where the mobile object is moving.

5. The control system according to claim 4, wherein
   the power source control unit does not have a storage area for storing control information for controlling the power source in a case where the mobile object is moving, other than the first storage area.

6. The control system according to claim 5, wherein
   the first storage area is a storage area that is not rewritten in a case where the power source control unit operates according to information stored in the first storage area.

7. The control system according to claim 1, wherein
   the first storage area includes second control information for causing the power source to supply power after the power source control unit is booted, and
   the power source control unit is configured to
      cause the power source to supply power in accordance with the second control information in a case where the mobile object control unit is updated by the update program, and
      cause the power source to supply power in accordance with the first control information in a case where the first storage area included in the power source control unit is updated by the update program.

8. The control system according to claim 1, wherein
   the update control unit is configured to receive the update program in a case where movement control of the mobile object is not performed.

9. The control system according to claim 1, wherein
   the power source includes a first battery and a step-down converter configured to step down an output voltage of the first battery,
   the mobile object includes a second battery charged by an output of the step-down converter, and
   the power source control unit and the mobile object control unit are configured to be operable by at least power supplied from the second battery.

10. The control system according to claim 9, wherein
    the mobile object control unit includes a drive device control unit configured to control a drive device for generating a driving force for driving the mobile object.

11. The control system according to claim 9, wherein
    the power source control unit includes a battery control unit configured to control the step-down converter,
    the battery control unit includes the first storage area and the second storage area, and
    the first control information includes at least control information for controlling the step-down converter.

12. The control system according to claim 11, wherein
    the power source further includes a cooling device configured to cool at least one of the battery and the step-down converter,
    the power source control unit further includes a cooling control unit configured to control the cooling device,
    the cooling control unit includes a first storage area to be updated by the update program and a second storage area not to be updated by the update program, and
    the cooling control unit includes, in the second storage area of the cooling control unit, first control information for operating the cooling device in a case where the first storage area of the cooling control unit is updated by the update program.

13. The control system according to claim 12, wherein
    the cooling device includes a refrigerant circuit through which a refrigerant for cooling the power source flows, and a pump for causing the refrigerant to flow in the refrigerant circuit, and
    the first control information included in the second storage area of the cooling control unit includes at least control information for operating the pump.

14. The control system according to claim 12, wherein
    the power source further includes a heat dissipation device configured to dissipate heat from the cooling device,
    the power source control unit further includes a heat dissipation control unit configured to control the heat dissipation device,
    the heat dissipation control unit includes a first storage area to be updated by the update program and a second storage area not to be updated by the update program, and
    the heat dissipation control unit includes, in the second storage area of the heat dissipation control unit, first control information for operating the heat dissipation device in a case where the first storage area of the heat dissipation control unit is updated by the update program.

15. The control system according to claim 14, wherein
    the heat dissipation device includes a fan, the first control information included in the second storage area of the heat dissipation control unit includes at least control information for operating the fan.

16. The control system according to claim 2, wherein the second storage area is configured to store a write program for writing the update program transmitted from the update control unit to the first storage area.

17. A mobile object comprising:
the control system according to claim 1.

18. The mobile object according to claim 17, wherein the mobile object is a vehicle.

19. A non-transitory computer-readable storage medium storing a program for causing a computer to function as:
   a power source control unit configured to control a power source included in a mobile object;
   a mobile object control unit configured to control the mobile object; and
   an update control unit configured to receive an update program of the power source control unit and the mobile object control unit and transmit the update program to one of the power source control unit and the mobile object control unit to be updated by the update program, wherein
   the power source control unit includes a first storage area to be updated by the update program and a second storage area not to be updated by the update program, and
   the power source control unit includes, in the second storage area, first control information for causing the power source to supply power in a case where the first storage area is updated by the update program transmitted from the update control unit.

20. A control method executed by a control system including a power source control unit for controlling a power source included in a mobile object and a mobile object control unit for controlling the mobile object, the control method comprising:
   receiving an update program of the power source control unit and the mobile object control unit; and
   transmitting the update program to one of the power source control unit and the mobile object control unit to be updated by the update program, wherein
   the power source control unit includes a first storage area to be updated by the update program and a second storage area not to be updated by the update program,
   the power source control unit includes, in the second storage area, first control information for causing the power source to supply power in a case where the first storage area is updated by the update program, and
   the control method further comprising: supplying power from the power source using the first control information in a case where the first storage area is updated by the update program.

* * * * *